(12) United States Patent
Ahdout

(10) Patent No.: US 8,677,806 B2
(45) Date of Patent: Mar. 25, 2014

(54) DEVICE FOR CONTROLLING LEAKS AND METHOD FOR OPERATING THE SAME

(76) Inventor: Hersal Ahdout, Beverly Hills, CA (US)

( * ) Notice: Subject to any disclaimer, the term of this patent is extended or adjusted under 35 U.S.C. 154(b) by 405 days.

(21) Appl. No.: 13/081,912

(22) Filed: Apr. 7, 2011

(65) Prior Publication Data

US 2012/0255342 A1 Oct. 11, 2012

(51) Int. Cl.
*G01M 3/40* (2006.01)

(52) U.S. Cl.
USPC ........................................... 73/40.5 R

(58) Field of Classification Search
USPC ............................ 73/40.5 R, 729.1, 729.2
See application file for complete search history.

(56) References Cited

U.S. PATENT DOCUMENTS

| | | | | |
|---|---|---|---|---|
| 5,377,529 A | * | 1/1995 | Boyd | 73/40 |
| 5,655,561 A | * | 8/1997 | Wendel et al. | 137/79 |
| 6,792,967 B1 | * | 9/2004 | Franklin | 137/312 |
| 7,082,959 B1 | * | 8/2006 | Franklin | 137/312 |
| 7,869,971 B2 | * | 1/2011 | Varga | 702/98 |
| 8,281,645 B2 | * | 10/2012 | Dryden | 73/40 |
| 2007/0125429 A1 | * | 6/2007 | Kandl | 137/389 |
| 2011/0320140 A1 | * | 12/2011 | Butler et al. | 702/45 |

* cited by examiner

*Primary Examiner* — John Fitzgerald
(74) *Attorney, Agent, or Firm* — Sofer & Haroun, LLP

(57) ABSTRACT

A leak detection system includes a water delivery device having a flow chamber, closing valve member and at least one contact seat for receiving a portion of the closing valve member. A first contact is located on the closing valve member and a second contact is located on the contact seat, where the first and second contacts are coupled to a leak detection circuitry. A water flow detection element is located within the flow chamber, where the leak detection circuitry is configured to be in an inactive mode when the first and second contacts are apart and where the leak detection circuit is set to active when the first and second contacts are in contact with one another, when the closing valve member and contact seat are in a closed arrangement.

13 Claims, 14 Drawing Sheets

| Basic Configuration | System Set Up | System Status |

| | | |
|---|---|---|
| Date | 10/19/2009 10:23 AM | Set Date/Time |
| Network Configuration | ⊙ DHCP  ○ Fixed Address | |
| ip Address | 127.0.01 | |
| Net Mask | 255.255.255.250 | |
| Security | ⊙ ON  ○ Fixed Address | |
| User ID | | |
| Password | | |
| Email Server | | |
| Email Address | | |
| Submit | | |

FIG. 12

| Basic Configuration | System Set Up | System Status | | | |
|---|---|---|---|---|---|
| Port | Active | Faucet ID | Monitor Mode | Duration (Sec) | Action |
| 1 | ☑ Yes | BATH1 - Faucet | ○ Active  ◉ Passive | | ☑ Email  ☐ Shut-Off  ☐ Buzzer |
| 2 | ☑ Yes | BATH1 - Toilet | ◉ Active  ○ Passive | 60 | ☑ Email  ☐ Shut-Off  ☐ Buzzer |
| 3 | ☑ Yes | BATH1 - Shower | ○ Active  ◉ Passive | | ☑ Email  ☐ Shut-Off  ☐ Buzzer |
| 4 | ☐ Yes | | ◉ Active  ○ Passive | | ☑ Email  ☐ Shut-Off  ☐ Buzzer |
| 5 | ☐ Yes | | ◉ Active  ○ Passive | | ☑ Email  ☐ Shut-Off  ☐ Buzzer |
| 6 | ☐ Yes | | ◉ Active  ○ Passive | | ☑ Email  ☐ Shut-Off  ☐ Buzzer |
| 7 | ☐ Yes | | ◉ Active  ○ Passive | | ☑ Email  ☐ Shut-Off  ☐ Buzzer |
| 8 | ☐ Yes | | ◉ Active  ○ Passive | | ☑ Email  ☐ Shut-Off  ☐ Buzzer |

Submit

FIG. 13

| Basic Configuration | System Set Up | System Status | | |
|---|---|---|---|---|
| Faucet ID | Status | Event Time | Shut-Off | Action |
| BATH1-Faucet | OK | | | |
| BATH1-Toilet | Dripping | 10/20/2009 11:30 PM | No | Shut - Off |
| BATH1-Shower | OK | | | |

FIG. 14

DEVICE FOR CONTROLLING LEAKS AND METHOD FOR OPERATING THE SAME

BACKGROUND

1. Field of the Invention

This application relates to a water service. More particularly, this application relates to water delivery device that detects leaks.

2. Description of the Related Art

A faucet dripping once per second, wastes up to 3000 gallons a year. Currently, water leak detection is limited to identification of excessive leakage by assessment of the incurred damages. Installing in-line equipment to detect leakage causes head loss (pressure drop) and low flow rate, and is thus inefficient, if not impossible in some instances. For example, with existing equipment, to detect a leak rate of 0.08 LPM, the flow rate is limited to 2.4 LPM. These ranges are not useful for addressing detection of dripping faucets.

The importance of dripping detection is heightened by the shortage of the commodity and associated cost of water. In some municipalities, the water is priced on a steep ascending scale based on consumption. In a normal household, the owner is the end user and they pay attention to the leakage. However, in public places and apartment houses where water is paid by the landlord, the leakage is often unattended for a long time.

OBJECTS AND SUMMARY

The present arrangement overcomes the drawbacks associated with the prior art and provides a cost effective leak detection apparatus and system for monitoring the same.

To this end, a leak detection system includes a water delivery device having a flow chamber, closing valve member and at least one contact seat for receiving a portion of the closing valve member. A first contact is located on the closing valve member and a second contact is located on the contact seat, where the first and second contacts are coupled to a leak detection circuitry. A water flow detection element is located within the flow chamber, where the leak detection circuitry is configured to be in an inactive mode when the first and second contacts are apart and where the leak detection circuit is set to active when the first and second contacts are in contact with one another, when the closing valve member and contact seat are in a closed arrangement.

BRIEF DESCRIPTION OF THE DRAWINGS

The present invention can be understood through the following description and accompanying drawings, wherein:

FIG. 12-14 show exemplary screen shots for the processor of FIG. 9 according to one embodiment.

DETAILED DESCRIPTION

Figure 1:
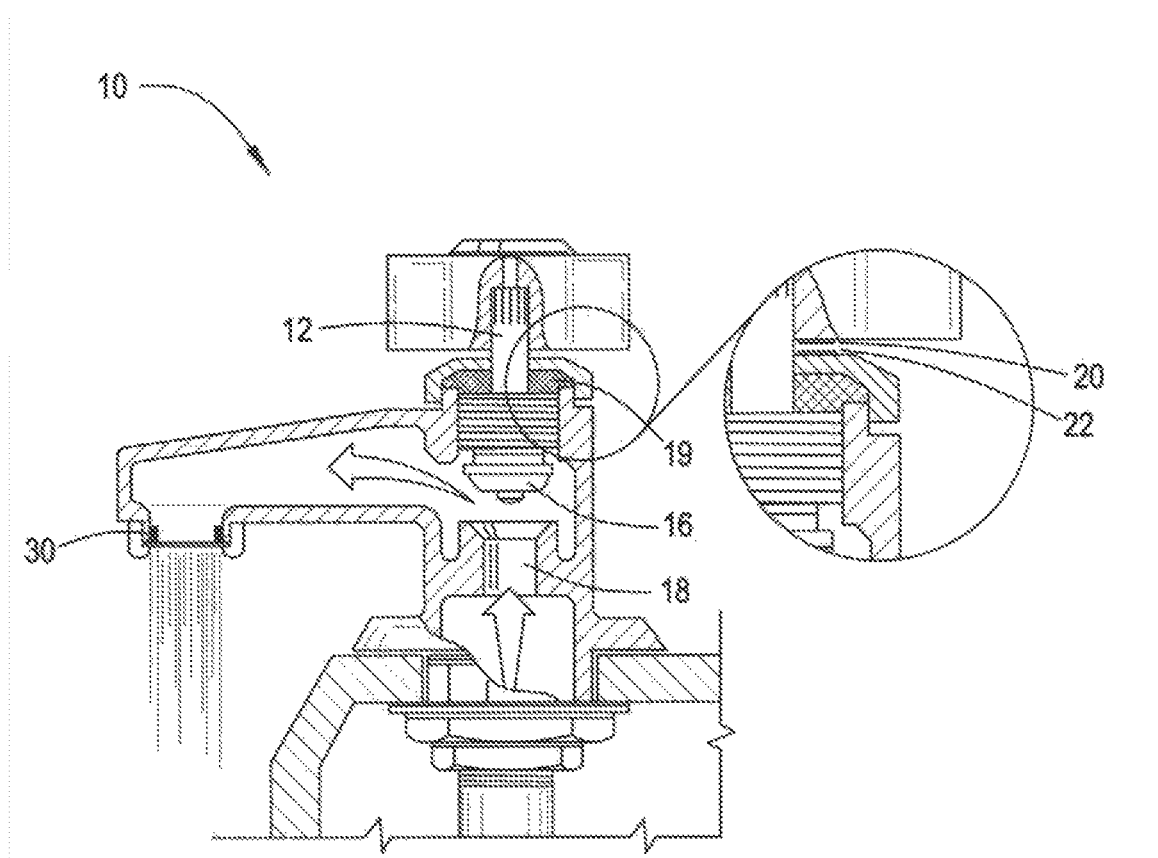
FIG. 1 shows a valve and leak detection system according to one embodiment.
Figure 2:
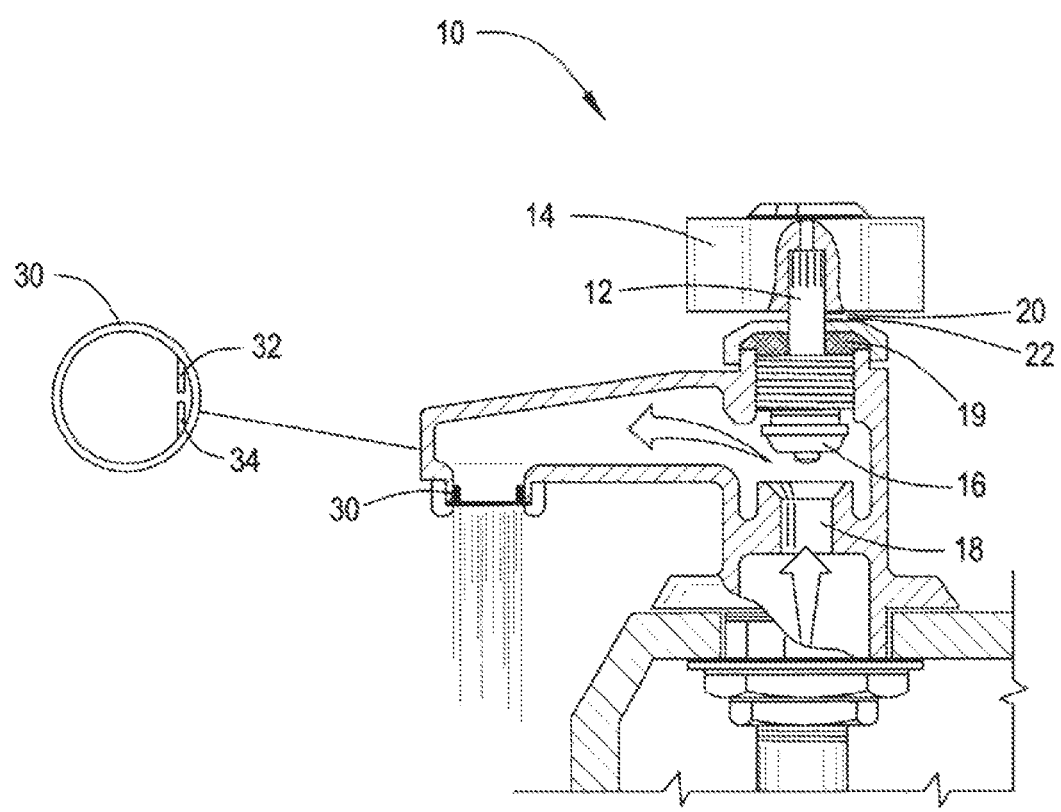
FIG. 2 shows a valve and leak detection system from FIG. 1 according to one embodiment.

In one embodiment of the present arrangement, as shown in FIGS. 1 and 2, a typical faucet 10 is shown having the normal stem 12, handle 14, closing washer 16 and valve seat 18. For the purposes of illustration, the present figures the present arrangement in the context of a manual shut valve 10. However, the same system may be implemented in conjunction with automatic valves/faucets such as timer faucets, electronic/motion activated faucets etc. . . . . .

At some location on faucet 10, a set of contacts 20 and 22 are placed in relation to one another such that when the valve is (intentionally) closed the contacts are in contact with one another and when the valve is (intentionally) open they are apart. For example in FIG. 1, contacts 20 and 22 are placed on the bottom of handle 14 and the top of a packing nut 19. In one arrangement contacts 20 and 22 may be installed with a hard wires to the detection circuitry that are hidden from view (described below) or with an Active RFID implementation.

It is noted that contacts 20 and 22 are dimensioned to not only fit in the area between the handle 14 and packing nut 19, but they must also be sized to be advantageously open when the faucet is opened (in varying amounts) and be dosed when the valve is closed. To this, end, in one arrangement, contacts 20 and 22 are made of thin copper plate. In one example, they may be constructed of 2.0-5.0×10 mm thin copper strip material. When these contacts 20 and 22 touch each other, they indicate closed position. This sizing is thin enough not to impede the ordinary faucet functionality while still be sufficient for a proper circuit contact.

It is noted that the presently described system, the details of which follow, may have some or all of the components built directly into the initial design of faucet 10 or, alternatively, they can be installed retroactively into existing faucets 10. In both arrangements, contacts 20 and 22 may be glued with water resistant glue or epoxy, but in initially designed faucets 10 contacts 20 and 22 may be advantageously micro-welded.

As shown in FIGS. 1 and 2 a leak detection washer 30 is placed at the end of the spout of faucet 10. Leak detection washer is formed as a discrete ring with two electrical contacts 32 and 34. As water passes over the contacts 32 and 34, the leak detection circuit is closed as discussed in more detail below. Ideally, contacts 32 and 34 are placed in the spout of faucet 10 in a manner to ideally be in the water path of the least amount of water possible. For example, in FIG. 2, these contacts 32 and 34 are placed against the indies of spout towards the valve components as this is here even a small trickle of water would pass.

Figure 3:
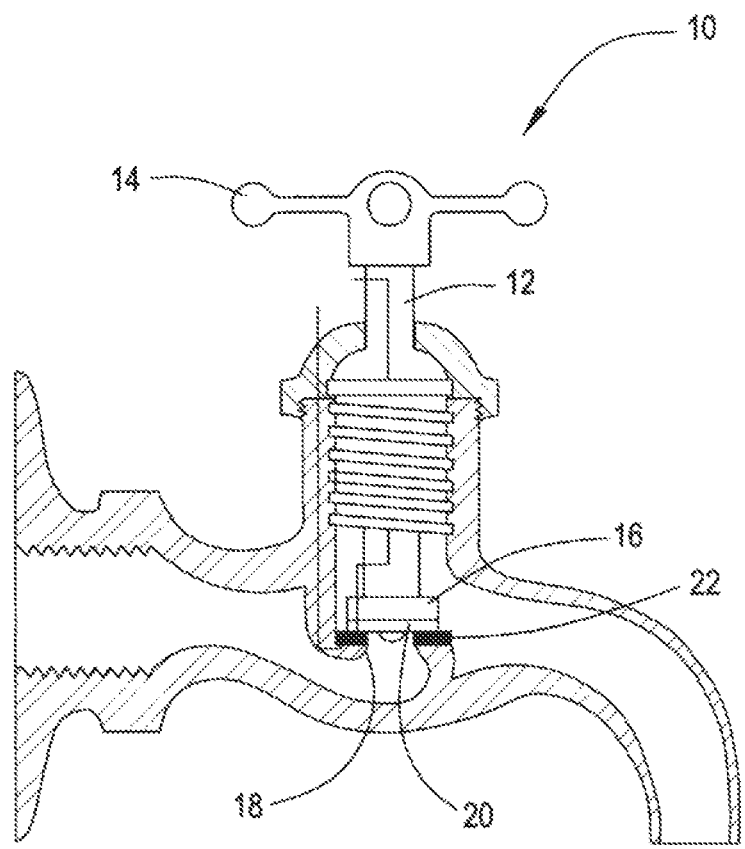
FIG. 3 shows an alternative valve and leak detection system according to one embodiment.
Figure 4:
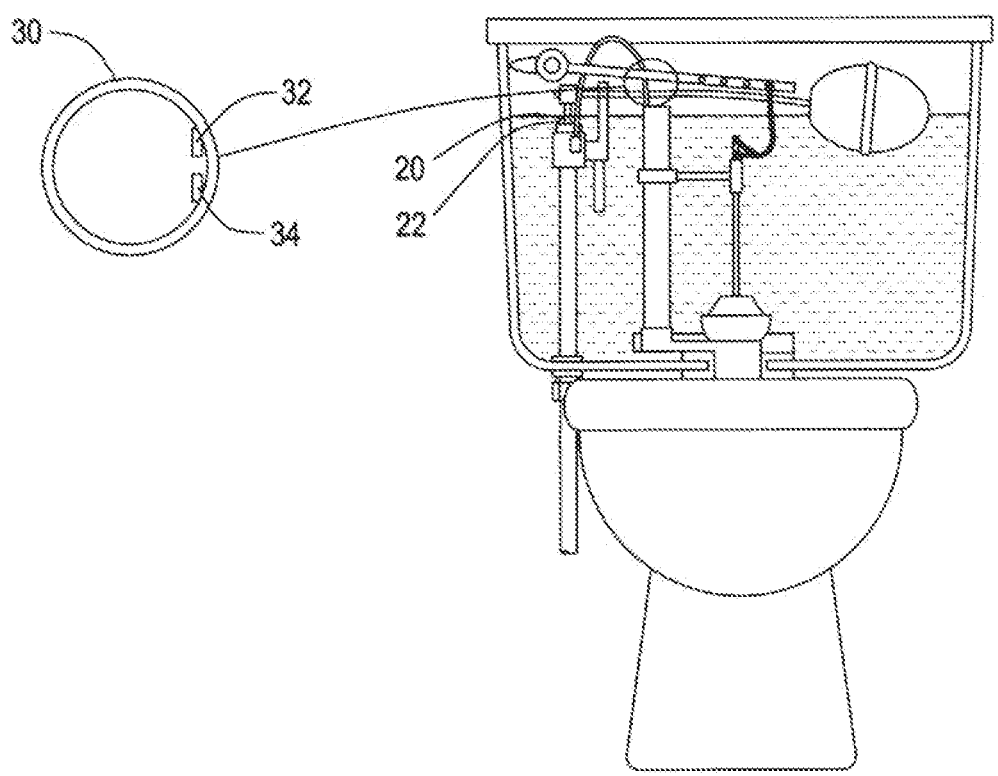
FIG. 4 shows an alternative valve and leak detection system according to one embodiment.

In one arrangement, FIG. 3 shows an alternative faucet design having the same components described above. In another arrangement FIG. 4 shows an alternative design having the same components described above in use in a toilet. It is contemplated that the salient features of the present device may be incorporated into any similar arrangement for water/valve installations.

Figure 5:
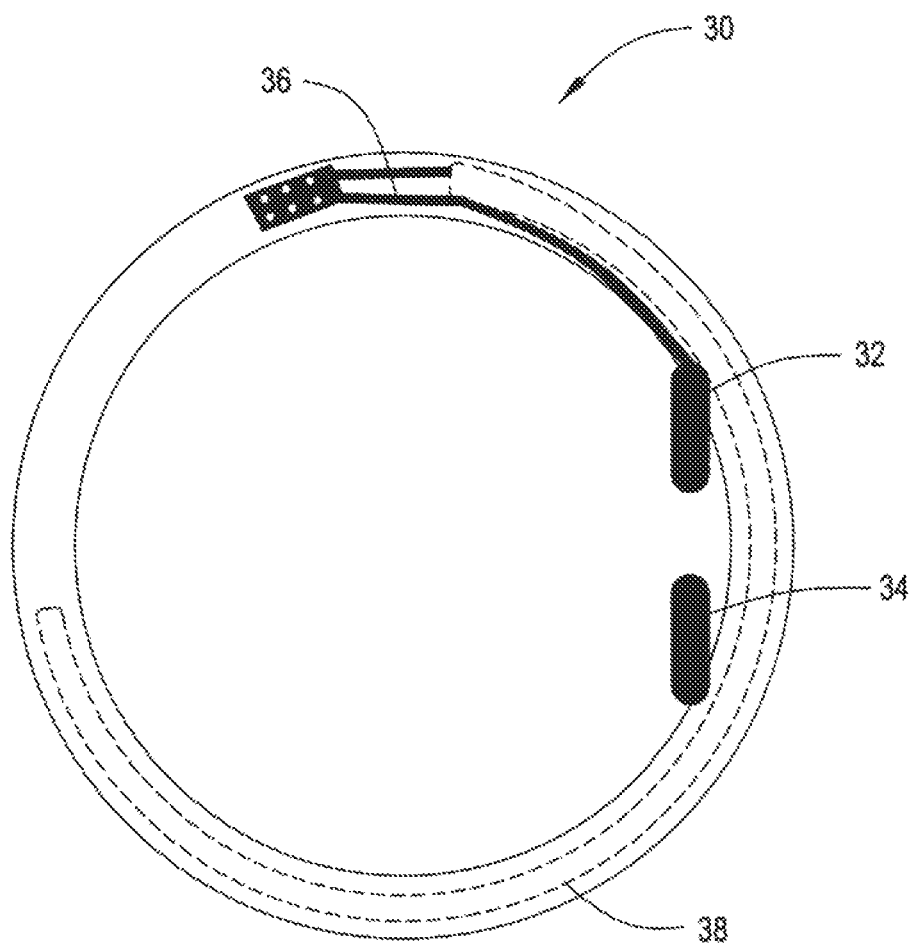
FIG. 5 shows a close up view of a leak detection washer according to one embodiment.

Turning to the structure of leak detection washer 30, FIG. 5 shows a close up view of the components including contacts 32 and 34 as well as onboard battery/relay 36 and an RFID transmitter 38. As with contacts 20 and 22, leak detection washer 30 may be either hardwired to the detection/monitoring circuitry (described below) or detection may be implemented via RFID (as shown) with transmission of a leak event being submitted wirelessly to the detection/monitoring circuitry as displayed here in FIG. 5. In one arrangement, contacts 22 and 34 of washer 30 may be constructed of similar materials and sizes as contacts 20 and 22 and may be installed in the same manner. Leak detection washer 30, in the case of the pictured RFID arrangement may be advantageously formed as a plastic encased active RFID transmitter (38) with its own battery 36. In some designs the power may be supplemented by a small solar panel that may be aesthetically designed into a newly designed faucet to extend battery life. As alternative, rather than using two separate contacts, leak detection washer 30 may employ a single contact that is constructed from a moisture sensitive material (not shown).

Leak detector washer 30 may be disc shaped and arranged within faucet 10 so that contacts 32 and 34 are at the front (user) end of the faucet opening. In normal faucet design, there is a slight angle to the opening of the faucet with the user end being just higher than the side of the opening away from a user. Because of this any normal hanging droplets tend to appear at the far end of the faucet opening away from the user. Thus, positioning contacts 32 and 34 is ideally such that normal hanging drops do not lead to excessive false positives caused by water detection when the circuit is closed, while at the same time minor leaks (even small amounts) can be detected. In one exemplary arrangement, contacts 32 and 34 are located on the lower side of the faucet 10 opening away from the user, but offset approximately 10-15 degrees to the side so that small leaks remain detectable but a small independent normal residual water droplet would not cause a false positive. This is intended to illustrate one exemplary position of contacts 32 and 34. It is understood that other positions of contacts 32 and 34 may be used within the context of the present arrangement.

Figure 6:
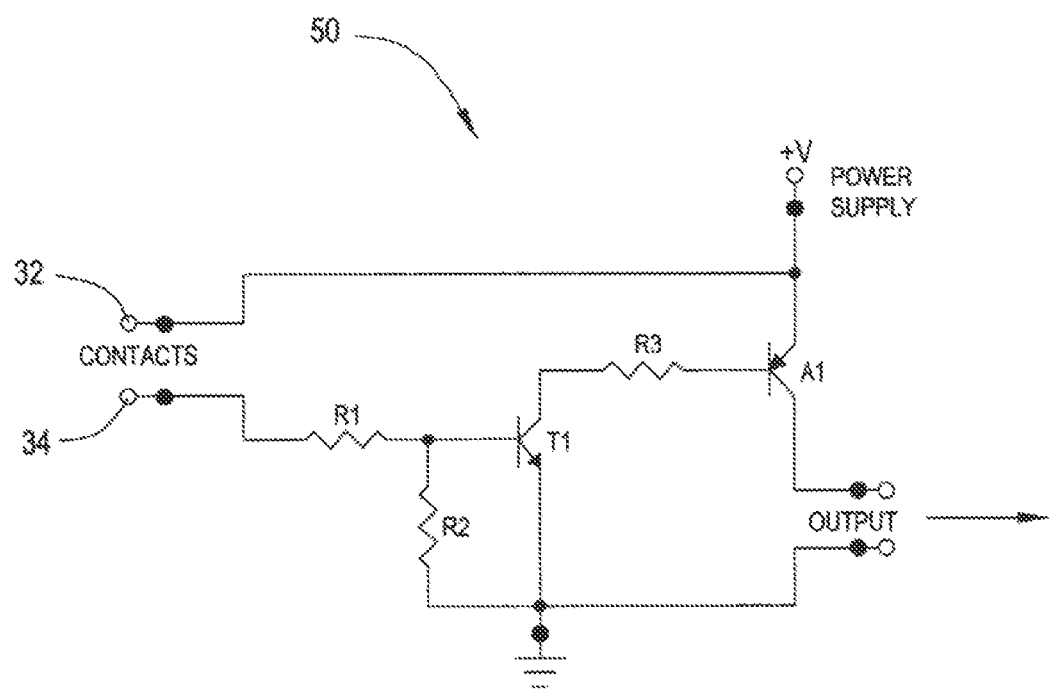
FIG. 6 shows a leak detection circuit according to one embodiment.

Turning now to the leak detection circuit, in one arrangement illustrated in FIG. 6, a leak detection circuit 50 is shown. In Circuit 50, R1, R2, & R3 are resistors calibrated to control flow of the electric current in circuit 50. T1 & A1 are a transistor and an amplifier respectively, wired as a high gain compound pair. The Power Supply is a low voltage power supply for powering circuit 50. The term "contacts" in FIG. 6 refer to contacts 32 and 34 of leak detection washer 30. The term "output" in FIG. 6 refers to the terminal points of circuit 50 that is connected to the micro-processor, discussed in more detail below.

In this circuit 50 a low voltage power supply is used. The transistor and amplifier are advantageously wired as a high gain compound pair. The current gain will be the product of each of their beta. The fluid which passes a minimum current of 4 $\mu A$ will activate the relay as it crosses contacts 32 and 34. This is easily achieved with tap water.

In one exemplary arrangement, circuit 50 is low powered with substantially (1.5 to 5 volts) and the electronic components of circuit 50 are preferably within 200 feet from the water service. For example, a microprocessor (discussed below) may be housed at a remote location (locations in larger buildings) near the fuse boxes and the like (management office, storage closet, etc. . . . ) Adjustments can be made to power and processor location for circuit 50 based on the communication mode (RFID, hard wire) to ensure necessary signal strength.

Figure 7:
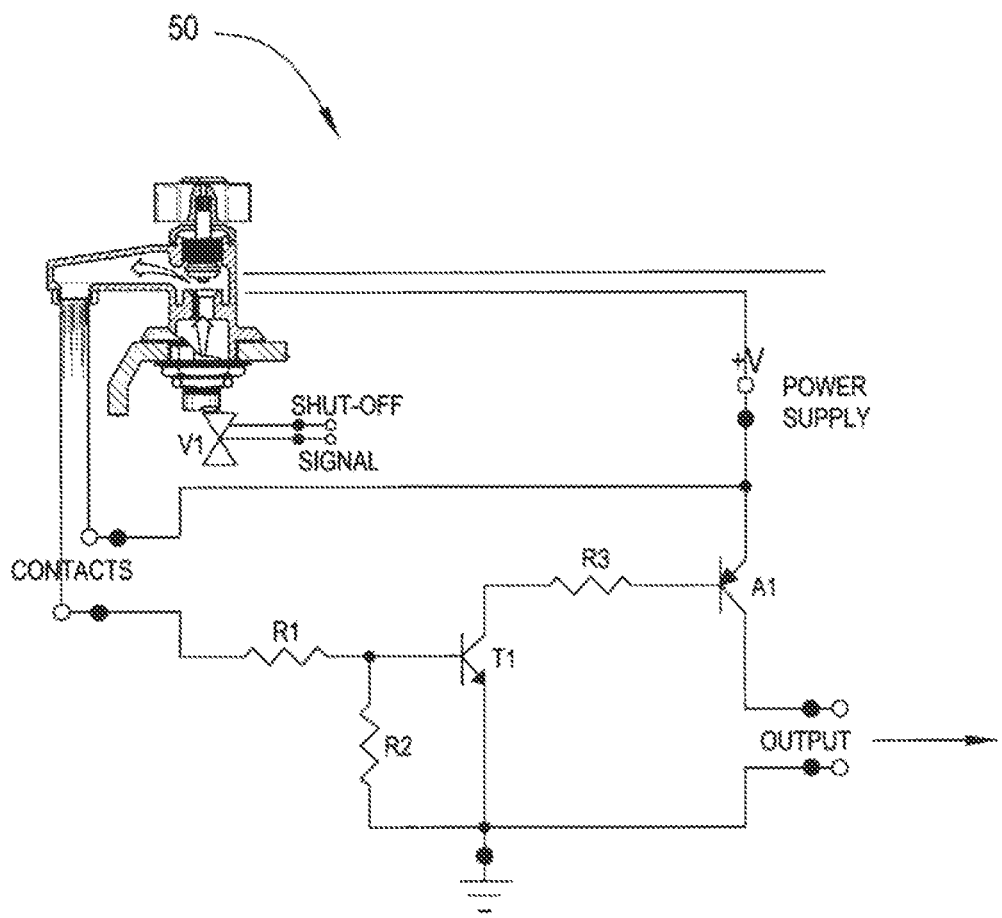
FIG. 7 shows the leak detection circuit of FIG. 6 connected to a shut off valve according to one embodiment.
Figure 8:
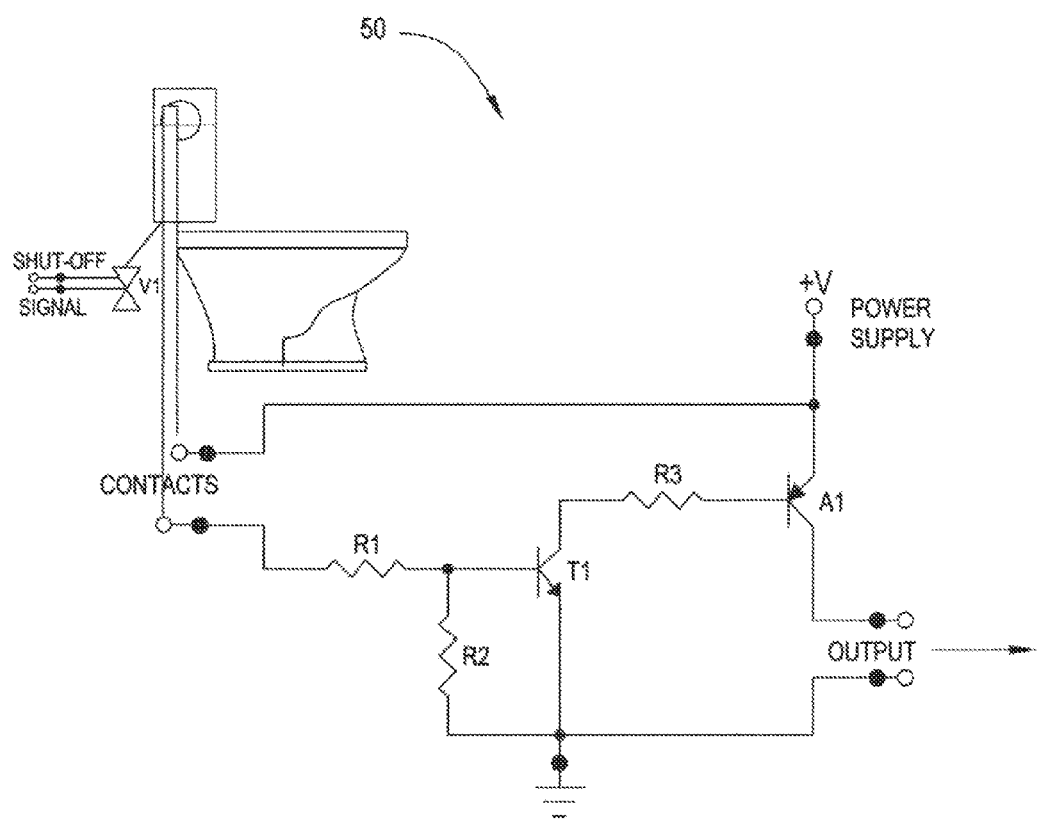
FIG. 8 shows the leak detection circuit of FIG. 6 connected to a shut off valve according to one embodiment.

FIGS. 7 and 8 shows the same circuit 50 with coupling to contacts 20 and 22 used to control circuit 50 in active mode (as opposed to passive mode—both described in detail below. It is understood from this, that contacts 20 and 22 may be placed in the context of any potential source of a water leakage situations including bathtub spouts, washbasins, outdoor garden hose faucets etc. . . . .

Also, as noted above, such a system as described herein may be incorporated into new faucets 10 or other water fixtures or retrofitted into existing structures. In both cases the wires needed to attach circuit 50 to the contact components in the faucet 10 are hidden as best as possible. In retrofit designs these wires would be tucked away and hidden as best as possible behind the physical structures. In newer designs that include the present system from inception, cavities may be formed in the physical components of faucet 10 to hold such wires internally.

Figure 9:
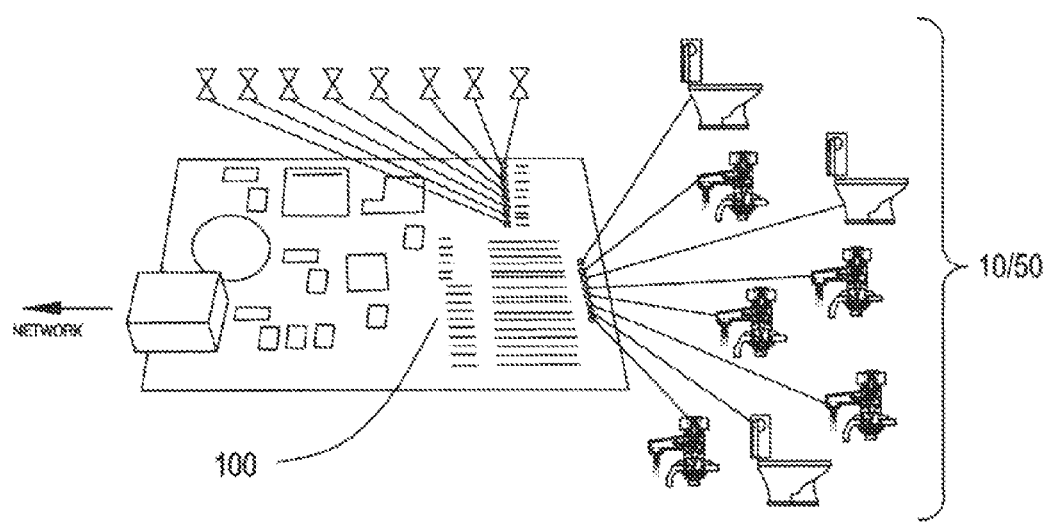
FIG. 9 shows a processor for connecting the leak detection circuit of FIG. 6 according to one embodiment.
Figure 10:
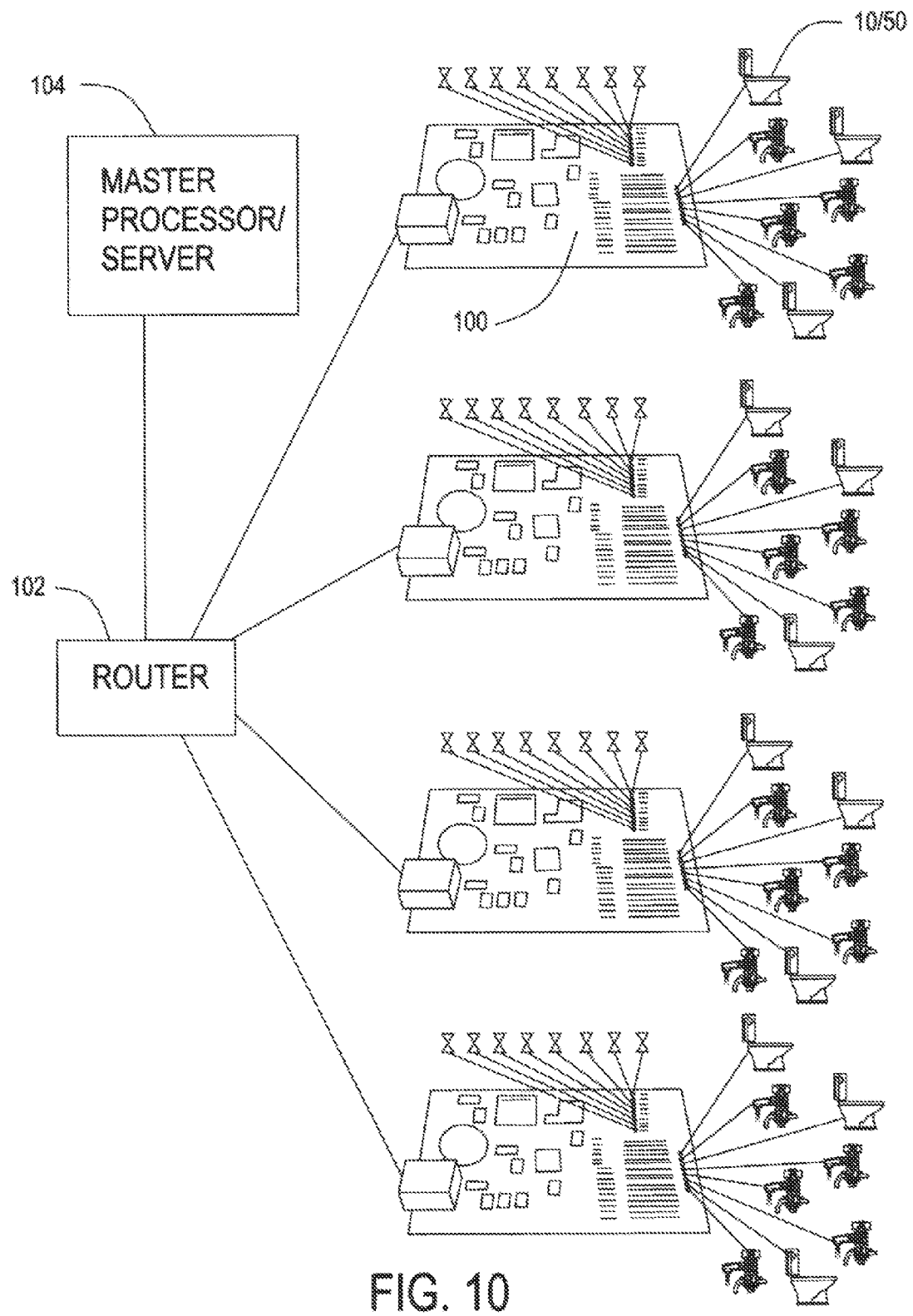
FIG. 10 shows a plurality of processors from FIG. 9 coupled to a common system according to one embodiment.

Turning to the processor, FIG. 9 shows an exemplary microprocessor 100 for use in controlling one or more leak detection circuits 50, implemented for example at various faucets 10 within a building (e.g. apartment building, office building etc. . . . ) In this arrangement, processor 100 is a programmable micro-chip that receives a signal from circuit 50 when contacts 32 and 34 are closed via a water leak, and based on the programmed options issues appropriate actions. Such connection with circuit 50 may be implemented using a phone line, Blue Tooth Wireless, or wired connection to micro-processor 100, connected via internet to the outside world, or a network of other processors 100. FIG. 10 shows an alternative arrangement, where a plurality of processors 100 are linked together via a router 102 and therefrom into a larger server 104 for monitoring larger numbers of leak detection circuits, for example in the case of larger multi dwelling units.

In the present example shown in FIG. 9, processor 100 is a Multi-Signal Processor that can monitor up to 8 input signals and up to 8 output ports to control the shut-off valves and/or simply provide detection alarms depending on the complexity/electronic capabilities or controls of faucets 10. In one arrangement, processor 100 has a wired TCP/IP web interface that allows a user to access and program the board using any standard web browser.

A Computer code (that is supported by Micro-processor 100) to assess the signal transmitted by circuit 50 and issue appropriate actions such as shutting down the valve, accumulating system condition, and issuing alerts based on user configuration may include the following capabilities Send signal to an external processor.

Send Pre-Configured Text Messages.

Call recipient on the phone and broadcast pre-programmed voice message regarding nature and location of the leak/drip.

Issue a pre-programmed text message regarding nature and location of the leak/drip to recipient texting device.

Issue a pre-programmed email message regarding nature and location of the leak/drip to recipient mail account inviting him/her to visit the web interface for additional control.

Issue a signal to a shut-off valve to stop the water supply.

In one arrangement, such an application for processor 100 may be implemented as a web application presented via Micro-Processor 100 allowing the user to configure the system functional preferences using a personal computer that is connected with Internet.

Using the above described equipment, there are two modes of detection that may be implemented by circuit 50 and processor 100 upon the detection of water at contacts 32 and 34.

In a first arrangement, active monitoring is used. In this implementation, the "on" triggering event is when contacts 20 and 22 are connected when faucet 10 is in a closed position. In other words circuit processor 50/100 monitors leak/drip condition at contacts 32 and 34 when the power is triggered on by closure of valve 10. To achieve this, the power supply for circuit 50 is routed through valve 10 as shown for example in FIG. 7. Once valve 10 is closed, contacts 20 and 22 meet and sensor contacts 32 and 34 are powered and any continuous presence of water at contacts 32 and 34 will trigger processor 100 to issue an alarm.

In this arrangement of circuit 50 with the power supply routed through valve 10 (stem 12 and seat 18) activation relay only occurs when faucet 10 is closed. The transistor and amplifier of circuit 50 are wired as a high gain compound pair. The current gain in this arrangement is a product of transistor and amplifier betas. The fluid drip/leak which is being detected is such to passes a current (eg. 4 µA minimum) across contacts 32 and 34 to activate the relay. This is easily achieved with tap water. In the case of an alarm, as noted above, shut off valve 10 may be optionally installed to allow programmed/automated shut off of the water supply to faucet 10.

In a second arrangement, a passive monitoring is used. In this implementation circuit 50 is constantly powered to monitor for leakage/dripping through contacts 32 and 34. The arrangement identifies leak/drip condition when the water presence is more than a pre-configured duration. In this model the program at processor 100 plays the major role in leak detection. This arrangement is shown for monitoring a toilet as shown in FIG. 8.

In circuit 50 the power supply activates the relay of contacts 32 and 34 at all times. As with the prior active monitoring mode the remaining settings are the same. This arrangement is useful where a normal shutoff even is supposed to happen within a given time frame (e.g. 5 minutes) after the valve is opened, for example when a toilet is flushed. In this passive mode, when a valve open condition processor 100 starts a timer and if water across contacts 32 and 34 is detected by circuit 50 after that time then an alarm indication is given.

Figure 11:
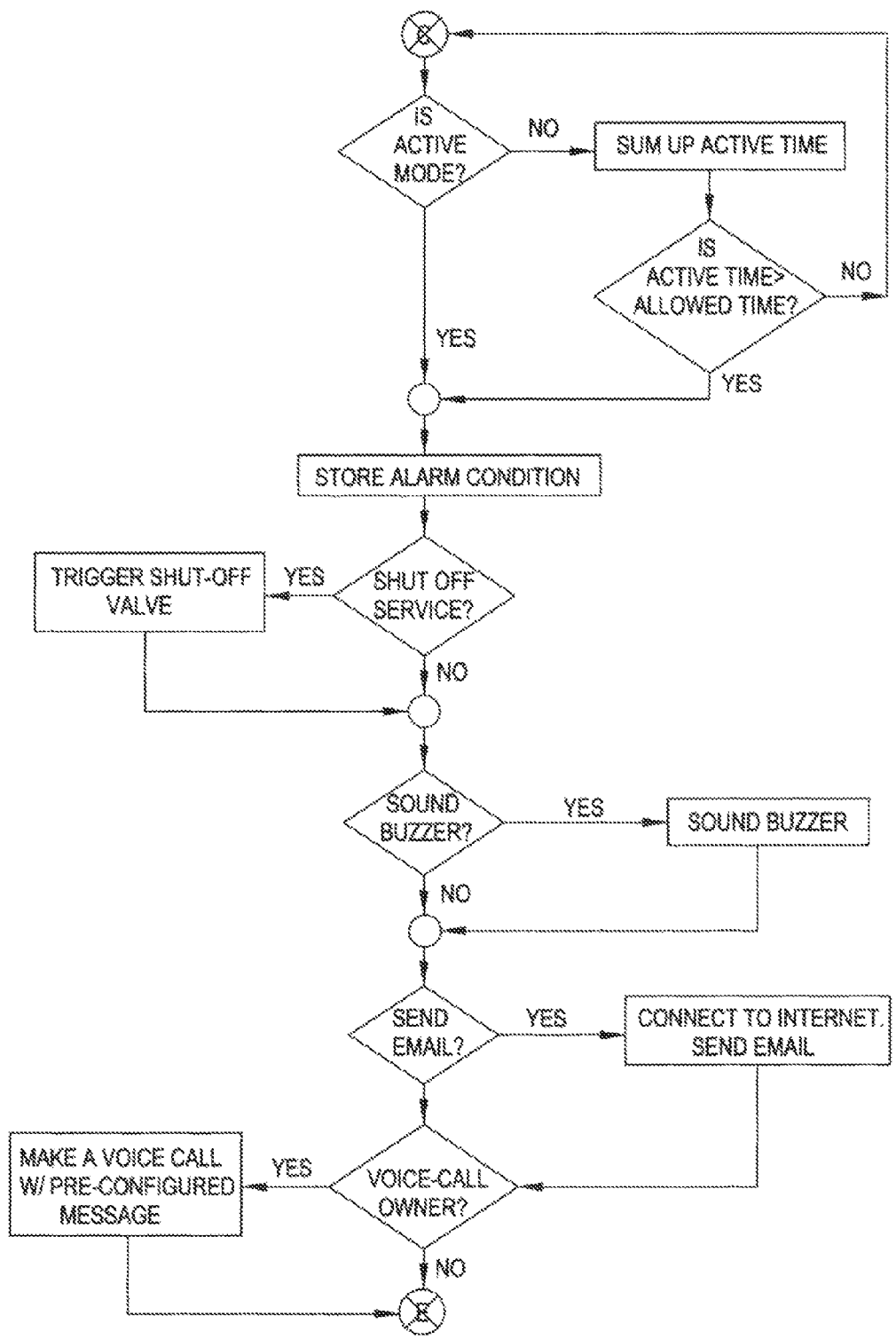
FIG. 11 is a flow chart that shows the post leak detection activity of the processor of FIG. 9 according to one embodiment.

Once an alarm/leak condition is met according to the prior described arrangement, FIG. 11 shows a flow chart of various actions that may be taken by processor 100. The top of the flow chart simply shows detection of an active leak at contacts 32 and 34 in either passive or active modes. At step 200, processor 100 stores the alarm condition and depending on the user settings and abilities of the faucet (water valve) 10, and then does any one or more of the following: shut off of the valve (202); sound a buzzer/alarm (204); send a notification e-mail (206); and/or send a voice/telephone notification (208).

FIG. 12 shows an exemplary system interface in a basic configuration panel as processed by processor 100. FIG. 13 shows a system interface for processor 100 that allows a user to configure the various settings for valves 10, including the setting of active or passive modes for each. FIG. 14 shows an exemplary system interface for processor 100 that shows a status warning for one of the connected valves 10 after circuit 50 detects a leak. It is understood that these are mere exemplary screen shots for presentation of the functions of processor 100 to a user. Any such display capable of showing the features of and allowing or control of the processor 100 and the various connected circuits 50 is within the contemplation of the present arrangement.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A leak detection system, said system comprising:
    a water delivery device having a flow chamber, closing valve member and a east one contact seat for receiving a portion of said closing valve member;
    a first contact located on said closing valve member;
    a second contact located on said contact seat, wherein said first and second contacts are coupled to a leak detection circuitry; and
    a water flow detection element located within said flow chamber, wherein said leak detection circuitry is configured to be in an inactive mode when said first and second contacts are apart and wherein said leak detection circuit is set to active when said first and second contacts are in contact with one another, when said closing valve member and contact seat are in a closed arrangement.

2. The leak detection system as claimed in claim 1, wherein said first and second contacts are metallic circuit components retroactively installed within said water delivery device.

3. The leak detection system as claimed in claim 1, wherein said first and second contacts are metallic circuit components initially constructed into said water delivery device.

4. The leak detection system as claimed in claim 1, wherein said water flow detection element is located at a final egress point of said flow chamber of said water delivery device.

5. The leak detection system as claimed in claim 1, wherein said water flow detection element is a metallic circuit component retroactively installed within said water delivery device.

6. The leak detection system as claimed in claim 1, wherein said water flow detection element is a metallic circuit component initially constructed into said water delivery device.

7. The leak detection system as claimed in claim 1, wherein said water flow detection element is wireless coupled to said leak detection circuitry.

8. The leak detection system as claimed in claim 1, wherein said leak detection circuit in an active arrangement conducts active monitoring of a triggering event at said water flow detection element for a time duration from the moment that first and second contacts connect within one another, wherein said triggering event is the detection of water at said water flow detection element beyond said time duration after said first and second contacts connect.

9. The leak detection system as claimed in claim 1, wherein said leak detection circuit in an active arrangement conducts passive monitoring of a triggering event at said water flow detection element continuously, only when said first and second contacts connect within one another wherein said triggering event is the detection of water at said water flow detection element at any time when said first and second contacts are connected after a predetermined shut off allowance time expires.

10. The leak detection system as claimed in claim 1, wherein said water deliver device is a faucet.

11. The leak detection system as claimed in claim 10, wherein said closing valve member is a handle for opening and closing said faucet.

12. The leak detection system as claimed in claim 1, further comprising a plurality of water delivery devices, each coupled to said leak detection circuit.

13. The leak detection system as claimed in claim 12, wherein said leak detection circuit is coupled to a display to show when a leak event occurs at one of said plurality of water delivery devices.

* * * * *

UNITED STATES PATENT AND TRADEMARK OFFICE
CERTIFICATE OF CORRECTION

PATENT NO.        : 8,677,806 B2                                              Page 1 of 1
APPLICATION NO.   : 13/081912
DATED             : March 25, 2014
INVENTOR(S)       : Ahdout It is certified that error appears in the above-identified patent and that said Letters Patent is hereby corrected as shown below:

In the Claim

Column 6, Claim 1, Line 4: The words "a east" between the word "and" and "one" should read "at least"

Signed and Sealed this
Third Day of June, 2014

Michelle K. Lee
*Deputy Director of the United States Patent and Trademark Office*